US 11,449,706 B2

(12) United States Patent
Gudovskiy et al.

(10) Patent No.: US 11,449,706 B2
(45) Date of Patent: Sep. 20, 2022

(54) INFORMATION PROCESSING METHOD AND INFORMATION PROCESSING SYSTEM

(71) Applicant: Panasonic Intellectual Property Corporation of America, Torrance, CA (US)

(72) Inventors: Denis Gudovskiy, Emeryville, CA (US); Takuya Yamaguchi, Osaka (JP); Yasunori Ishii, Osaka (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 255 days.

(21) Appl. No.: 16/849,334

(22) Filed: Apr. 15, 2020

(65) Prior Publication Data

US 2020/0242398 A1 Jul. 30, 2020

Related U.S. Application Data

(63) Continuation of application No. PCT/JP2019/027259, filed on Jul. 10, 2019.
(Continued)

(30) Foreign Application Priority Data

Apr. 12, 2019 (JP) .............................. JP2019-076509

(51) Int. Cl.
*G06K 9/62* (2022.01)
*G06N 3/08* (2006.01)
(Continued)

(52) U.S. Cl.
CPC ............. *G06K 9/6228* (2013.01); *G06N 3/08* (2013.01); *G06N 20/00* (2019.01); *G06V 20/10* (2022.01)

(58) Field of Classification Search
CPC ........ G06K 9/6228; G06N 20/00; G06N 3/08; G06V 20/10
See application file for complete search history.

(56) References Cited

U.S. PATENT DOCUMENTS 10,032,072 B1 * 7/2018 Tran .................... H04N 5/23229
10,902,051 B2 * 1/2021 Hu ......................... G06F 16/532
(Continued)

FOREIGN PATENT DOCUMENTS

| JP | 2002-74368 | 3/2002 |
| JP | 2013-125524 | 6/2013 |

OTHER PUBLICATIONS

Ren, Shaoqing, et al. "Faster r-cnn: Towards real-time object detection with region proposal networks." Advances in neural information processing systems 28 (2015). (Year: 2015).*
(Continued)

*Primary Examiner* — Utpal D Shah
(74) *Attorney, Agent, or Firm* — Wenderoth, Lind & Ponack, L.L.P.

(57) ABSTRACT

An information processing method performed by a computer includes: obtaining a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing; obtaining an indication designating a part to be analyzed in the sensing data; selecting at least one recognition result candidate from the plurality of recognition result candidates, based on (i) a relationship between each of the plurality of recognition result candidates and the part and (ii) the likelihood of each of the plurality of recognition result, candidates; and outputting the at least one recognition result candidate that is selected.

7 Claims, 12 Drawing Sheets

Related U.S. Application Data

(60) Provisional application No. 62/728,418, filed on Sep. 7, 2018.

(51) Int. Cl.
*G06N 20/00* (2019.01)
*G06V 20/10* (2022.01)

(56) References Cited

U.S. PATENT DOCUMENTS

| | | | |
|---|---|---|---|
| 11,314,982 B2* | 4/2022 | Price | G06N 5/003 |
| 2020/0311943 A1* | 10/2020 | Dai | G06K 9/6256 |
| 2020/0389591 A1* | 12/2020 | Liu | H04N 5/783 |
| 2021/0142097 A1* | 5/2021 | Zheng | G06V 10/454 |

OTHER PUBLICATIONS

Tang, Peng, et al. "Weakly supervised region proposal network and object detection." Proceedings of the European conference on computer vision (ECCV). 2018. (Year: 2018).*

International Search Report dated Oct. 8, 2019 in International (PCT) Application No. PCT/JP2019/027259.

Luisa M Zintgraf et al., "Visualizing Deep Neural Network Decisions: Prediction Difference Analysis", Feb. 15, 2017, arXiv:1702.04595.

Wei Liu et al., "SSD: Single Shot MultiBox Detector," arXiv:1512.02325(2016).

K. He et al., "Deep residual learning for image recognition", arXiv preprint arXiv:1512.03385 (2015).

J. Huang et al., "Speed/accuracy trade-offs for modern convolutional object detectors", avXiv:1611.10012 In CVPR (2017).

M. D. Zeiler et al., "Visualizing and understanding convolutional networks", In ECCV (2014).

K. Simonyan et al., "Deep inside convolutional networks: visualising image classification models and saliency maps", arXiv preprint arXiv:1312.6034 (2014).

J. T. Springenberg et al., "Striving for simplicity: the all convolutional net," arXiv:1412.6806 In ICLR (2015).

M. T. Ribeiro et al., "Why should I trust you: explaining the predictions of any classifier", arXiv:1602.04938 In SIGKDD (2016).

S. M. Lundberg et al., "A unified approach to interpreting model predictions", arXiv:1705.07874 In NIPS (2017).

A. Shrikumar et al., "Learning important features through propagating activation differences", arXiv preprint arXiv:1704.02685 (2017).

S. Mukund et al., "Axiomatic attribution for deep networks," arXiv preprint arXiv:1703.01365 (2017).

* cited by examiner

INPUT IMAGE

IDENTIFICATION RESULT

INPUT IMAGE

DETECTION RESULT

POSITIVE CONTRIBUTION

NEGATIVE CONTRIBUTION

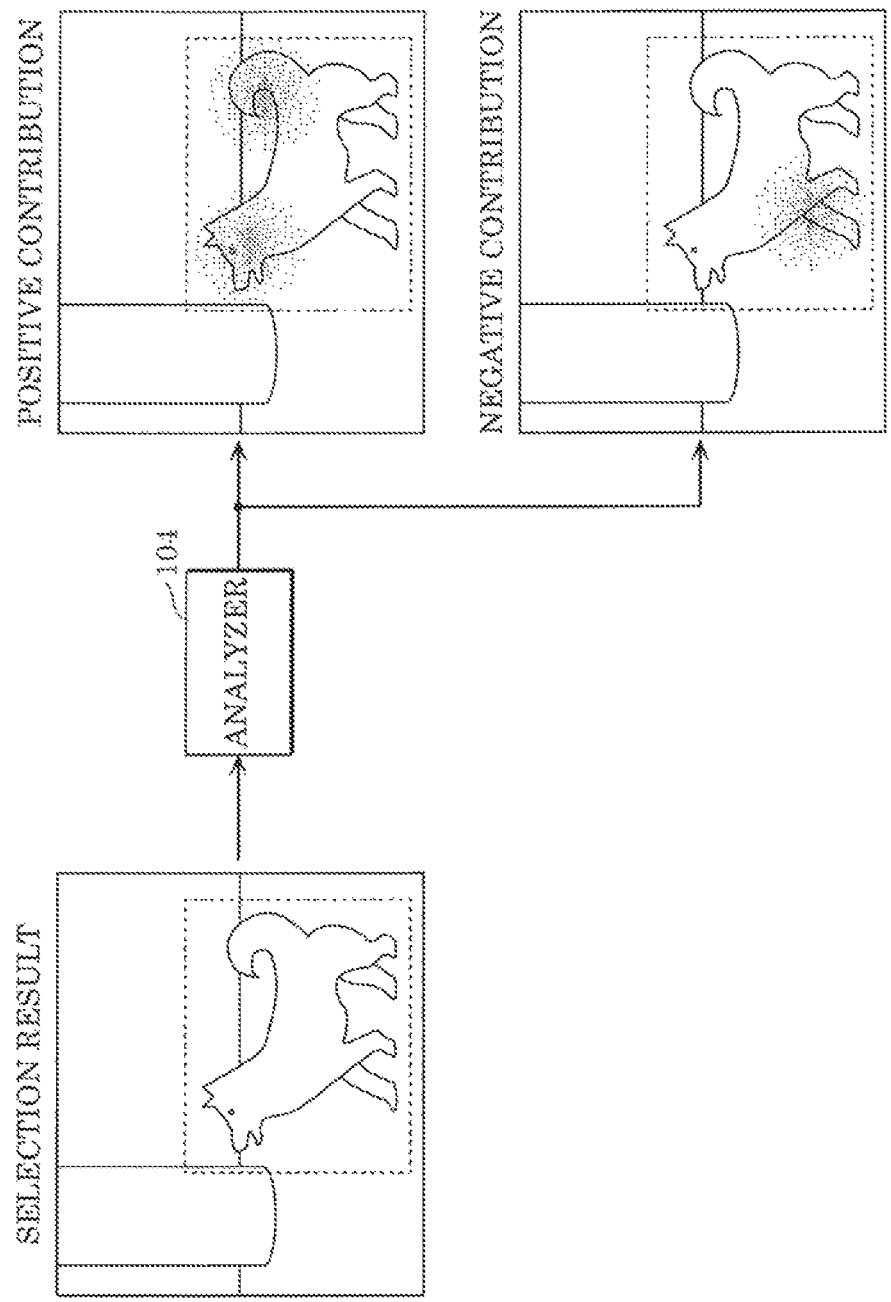

INFORMATION PROCESSING METHOD AND INFORMATION PROCESSING SYSTEM

CROSS REFERENCE TO RELATED APPLICATIONS

This application is a U.S. continuation application of PCT International Patent Application Number PCT/JP2019/027259 filed on Jul. 10, 2019, claiming the benefit of priority of U.S. Provisional Patent Application No. 62/728,418 filed on Sep. 7, 2018, and Japanese Patent Application Number 2019-076509 filed on Apr. 12, 2019, the entire contents of which are hereby incorporated by reference.

BACKGROUND

1. Technical Field

The present disclosure relates to an information processing method, etc.

2. Description of the Related Art

Methods of visualizing the response of a deep neural network have been conventionally proposed (for example, Luisa M Zintgraf, et al. "Visualizing Deep Neural Network Decisions: Prediction Difference Analysis", Feb. 15, 2017, https://arxiv.org/pdf/1702.04596.pdf.).

SUMMARY

However, in recognition processing such as object detection, an object is not detected in some cases, which makes it difficult to analyze output of recognition processing.

The present disclosure therefore has an object of providing an information processing method, etc. that can output information for analysis of output of recognition processing even in the case where an object is not detected in recognition processing.

An information processing method according to an aspect of the present disclosure is an information processing method performed by a computer and including: obtaining a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing: obtaining an indication designating a part to be analyzed in the sensing data; selecting at least one recognition result candidate from the plurality of recognition result candidates, based on (i) a relationship between each of the plurality of recognition result candidates and the part and (ii) the likelihood of each of the plurality of recognition result candidates; and outputting the at least one recognition result candidate that is selected.

These general and specific aspects may be implemented using a system, a device, a method, an integrated circuit, a computer program, or a non-transitory computer-readable recording medium such as CD-ROM, or any combination of systems, devices, methods, integrated circuits, computer programs, and recording media.

With the information processing method, etc. according to an aspect of the present disclosure, information for analysis of output of recognition processing can be output even in the case where an object, is not detected in recognition processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is an image diagram illustrating a mode of the information processing system in the embodiment;

FIG. 20 is a conceptual diagram illustrating a process of an analyzer in the embodiment.

DETAILED DESCRIPTION OF THE EMBODIMENT (Underlying Knowledge Forming Basis of the Present Disclosure)

Neural network type recognition models have begun to be used in recent years. A neural network is a mathematical model simulating biological nerves, and the mathematical model can have a plurality of layers. A neural network type recognition model is a model formed by a neural network, and is used to perform recognition processing. For example, sensing data such as an image is input to a neural network type recognition model, and the contents of the sensing data are recognized by the neural network type recognition model.

Various recognition models perform various recognition processing. Such recognition processing is classified into identification processing, detection processing, segmentation processing, and the like. For example, in identification processing, what sensing data represents is identified. Identification processing is also referred to as classification processing, and, for example, sensing data is classified into one of a plurality of types. In detection processing, for example, a part representing contents to be detected in sensing data is detected. Alternatively, in detection processing, which part of sensing data represents what is detected.

Figure 1:
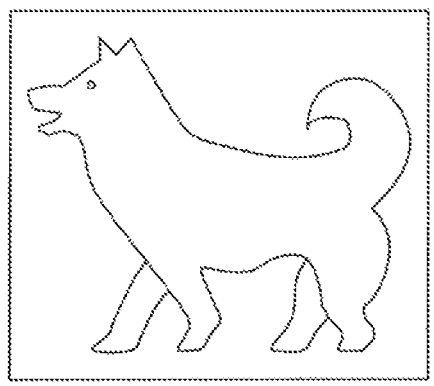
FIG. 1 is an image diagram illustrating an input image used in identification processing in a reference example.

FIG. 1 is an image diagram illustrating an input image used in identification processing in a reference example. For example, the input image illustrated in FIG. 1 is input to a recognition model for performing identification processing.

Figure 2:
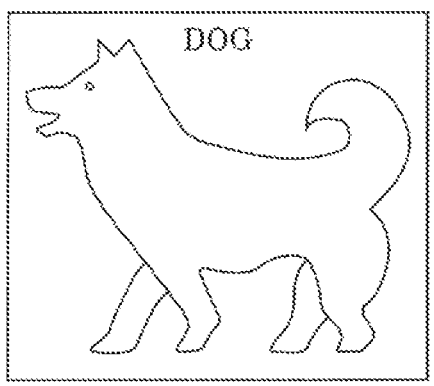
FIG. 2 is an image diagram illustrating an identification result obtained by the identification processing in the reference example.

FIG. 2 is an image diagram illustrating an identification result obtained by the identification processing in the reference example. For example, as a result of the input image illustrated in FIG. 1 being input to the recognition model tor performing identification processing, the identification result illustrated in FIG. 2 is obtained. Specifically, the identification result that the input image represents a dog is obtained.

Figure 3:
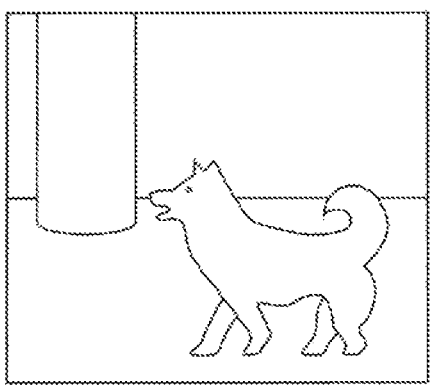
FIG. 3 is an image diagram illustrating an input image used in detection processing in the reference example.

FIG. 3 is an image diagram illustrating an input image used in detection processing in the reference example. For example, the input image illustrated in FIG. 3 is input to a recognition model for performing detection processing.

Figure 4:
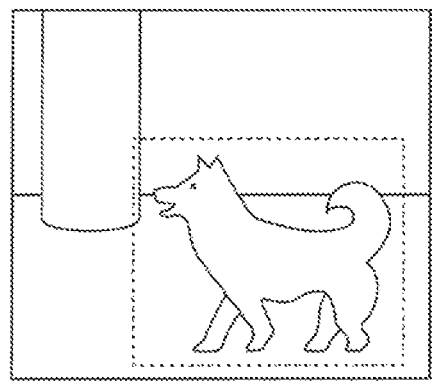
FIG. 4 is an image diagram illustrating a detection result obtained by the detection processing in the reference example.

FIG. 4 is an image diagram illustrating a detection result obtained by the detection processing in the reference example. For example, as a result of the input image illustrated in FIG. 3 being input to the recognition model for performing detection processing, the identification result illustrated in FIG. 4 is obtained. Specifically, a part representing a dog is obtained as the detection result. In other words, the detection result that the dotted frame part in FIG. 4 represents a dog is obtained.

To analyze recognition models for performing identification processing for sensing data, methods of deriving the contribution of each of a plurality of values included in sensing data to an identification result have been proposed.

Specific examples of such methods include prediction difference analysis (PDA), local interpretable model-agnostic explanations (LIME), gradient-weighted class activation mapping (Grad-CAM), and guided back propagation (G Back Prop). An example is described in Luisa M Zintgraf, et al. "Visualizing Deep Neural Network Decisions: Prediction Difference Analysis", Feb. 15, 2017, https://arxiv.org/pdf/1702.04595.pdf.

For example, in the case where input sensing data is an image, the contribution of each of a plurality of pixel values included in the image to the identification result of the image is derived based on such a method.

Figure 5:
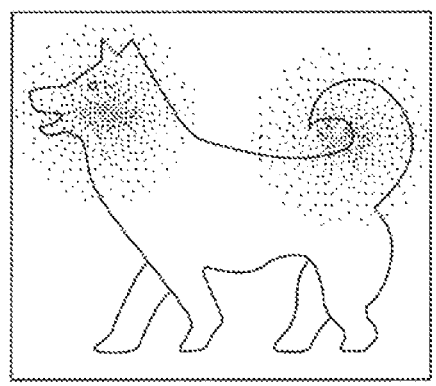
FIG. 5 is an image diagram illustrating positive contribution to the identification result, in the reference example.

FIG. 5 is an image diagram illustrating positive contribution to the identification result illustrated in FIG. 2. In FIG. 5, the degree of positive contribution to the identification result that the input image represents a dog is expressed by point density, for the sake of convenience. The degree of positive contribution to the identification result may be actually expressed by, for example, color density for each pixel.

In this example, a part showing the head of a dog and a part showing the tail of a dog in the input image positively contribute to the identification result that, the input image represents a dog. That is, the part showing the head of a dog and the part showing the tail of a dog guide the identification in such a direction that the input image represents a dog.

Figure 6:
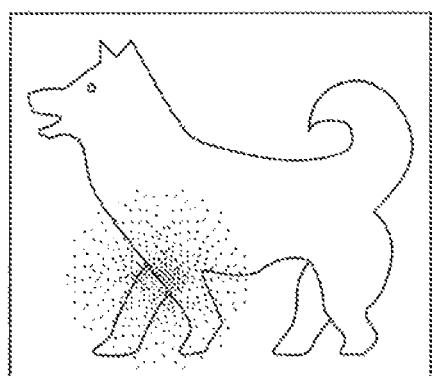

FIG. 6 is an image diagram illustrating negative contribution to the identification result illustrated in FIG. 2. In FIG. 5, the degree of negative contribution to the identification result that the input image represents a dog is expressed by point density, for the sake of convenience. The degree of negative contribution to the identification result may be actually expressed by, for example, color density for each pixel.

In this example, a part showing the front legs of a dog in the input image negatively contributes to the identification result that the input linage represents a dog. That is, the part showing the front legs of a dog guides the identification in such a direction that the input image does not represent a dog.

Although positive contribution and negative contribution are separately expressed in this example, positive contribution and negative contribution may be expressed in combination. For example, the degree of positive contribution to the identification result and the degree of negative contribution to the identification result may be expressed respectively by red color density and blue color density.

According to the information illustrated in FIGS. 5 and 6, the factor of the identification result that the input image represents a dog is indicated. Such information is useful for improvement in the accuracy of the recognition model: For example, in the case where the identification result is wrong, adjustment of parameters in the recognition model, relearning, or the like can be performed based on the factor. This efficiently improves the accuracy of the recognition model.

However, while the identification result of identification processing is simple, the detection result: of detection processing is complex. It is therefore difficult to apply the process of driving contribution in identification processing to detection processing.

For example, in the case where an object is detected correctly or detected wrongly in detection processing, it may be possible to derive the degree of contribution of each pixel in the image to the detection of the object. In some cases, however, an object is not detected in detection processing. In such cases, no degree of contribution to object detection is available, and thus it is difficult to derive contribution.

Hence, for example in the case where, despite an object being shown in an image, the object is not detected in detection processing, it is difficult to analyze the detection result and to efficiently improve the accuracy of the recognition model.

In view of this, for example, an information processing method according to an aspect of the present disclosure is an information processing method performed by a computer and including: obtaining a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing; obtaining an indication designating a part to be analyzed in the sensing data; selecting at least one recognition result candidate from the plurality of recognition result candidates, based on (i) a relationship between each of the plurality of recognition result candidates and the part and (ii) the likelihood of each of the plurality of recognition result candidates; and outputting the at least one recognition result candidate that is selected.

Thus, even in the case where an effective recognition result is not obtained in recognition processing, a recognition result candidate useful for analysis processing or the like can be output based on the designated part. That is, even in the case where an object is not detected in recognition processing, information for analysis of output of recognition processing can be output.

For example, the information processing method performed by the computer further includes: presenting a processing result based on the at least one recognition result candidate that is output.

Thus, the processing result of analysis processing or the like based on the selected recognition result candidate can be presented.

For example, the processing result indicates a degree of contribution of each of a plurality of values included in the sensing data to a likelihood of each of the at least one recognition result candidate that is output.

Thus, the contribution of each of the plurality of values in the sensing data to the selected recognition result candidate can be presented.

For example, the relationship is at least one of: whether the recognition result candidate overlaps with the part: and a degree of overlap of the recognition result candidate with the part.

Thus, the recognition result candidate selected based on whether it overlaps with the designated part or the degree of the overlap can be output.

For example, each of the at least one recognition result candidate selected from the plurality of recognition result candidates is a recognition result candidate whose likelihood is higher than a threshold among the plurality of recognition result candidates.

Thus, a recognition result candidate with a high likelihood can be selected, so that a more useful recognition result candidate can be output.

For example, the information processing method performed by the computer further includes: lowering the threshold, in a ease where a total number of recognition result candidates selected from the plurality of recognition result candidates based on the relationship, the likelihood, and the threshold is less than or equal to a predetermined number; and selecting the at least one recognition result candidate, based on the relationship, the likelihood, and the threshold lowered.

Thus, for example in the case where there is no recognition result candidate whose likelihood is higher than the threshold, the threshold can be lowered, and a recognition result candidate whose likelihood is higher than the lowered threshold can be selected.

For example, the information processing method performed by the computer further includes: outputting a likelihood of each of the at least one recognition result candidate that is selected.

Thus, the likelihood of the selected recognition result candidate can be output, as information useful for analysis processing or the like.

For example, the sensing data is an image, the recognition processing is object recognition processing on the image, and each of the plurality of recognition result candidates is a candidate for an object shown in the image.

Thus, in object recognition processing performed on an image, a candidate for an object shown in the image can be output.

For example, an information processing system according to an aspect of the present disclosure includes: a computer that: obtains a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing; obtains an indication designating a part to be analyzed in the sensing data; selects at least one recognition result, candidate from the plurality of recognition result candidates, based on (i) a relationship between each of the plurality of recognition result candidates and the part, and (ii) the likelihood of each of the plurality of recognition result candidates; and outputs the at least one recognition result candidate that is selected.

Thus, even in the case where an effective recognition result is not obtained in recognition processing, the information processing system can output a recognition result candidate useful for analysis processing or the like based on the designated part. That is, even in the case where an object is not detected in recognition processing, the information processing system can output information for analysis of output of recognition processing.

These general and specific aspects may be implemented using a system, a device, a method, an integrated circuit, a computer program, or a non-transitory computer-readable recording medium such as CD-ROM, or any combination of systems, devices, methods, integrated circuits, computer programs, and recording media.

An embodiment will be described in detail below, with reference to the drawings. The embodiment described below shows a general or specific example. The numerical values, shapes, materials, structural elements, the arrangement and connection of the structural elements, steps, the processing order of the steps etc. shown in the following embodiment are mere examples, and do not limit the scope of claims. Of the structural elements in the embodiment described below, the structural elements not recited in any one of the independent claims representing the broadest concepts are described as optional structural elements.

EMBODIMENT

Figure 7:
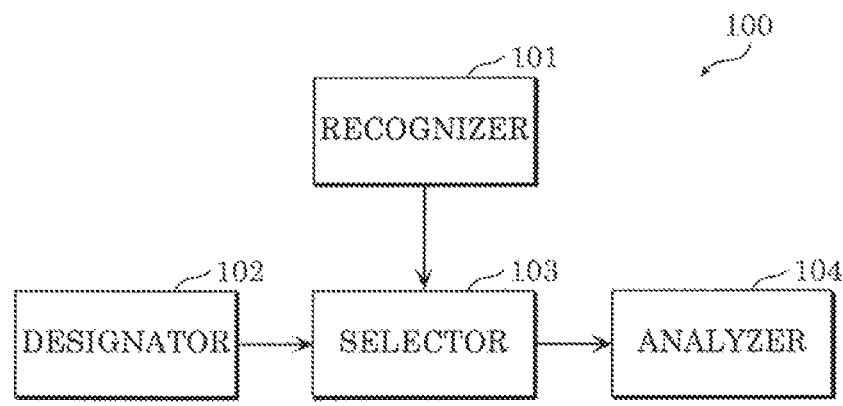
FIG. 7 is a block diagram illustrating a structure of an information processing system in an embodiment.

FIG. 7 is a block diagram illustrating a structure of an information processing system in this embodiment. Information processing system 100 illustrated in FIG. 7 includes recognizer 101, designator 102, selector 103, and analyzer 104. For example, each structural element is composed of an electric circuit, and can transfer information to other structural elements by wire or wireless communication or via an input/output circuit or the like.

Recognizer 101 is an information processor that obtains sensing data and performs recognition processing on the sensing data. For example, by inputting the sensing data to a recognition model, recognizer 101 performs recognition processing on the sensing data and obtains a recognition result. Here, by inputting the sensing data to the recognition model, recognizer 101 obtains a plurality of recognition result candidates in the sensing data and the likelihood of each of the plurality of recognition result candidates. Recognizer 101 then obtains a final recognition result indicating a recognition result candidate whose likelihood is greater than or equal to a threshold.

For example, the sensing data is an image, the recognition processing is object detection processing on the image, the recognition result is the detection result as illustrated in FIG. 4, and the plurality of recognition result candidates are each a candidate for an object in the image. Moreover, the recognition model is a model that, is trained by machine learning and performs the recognition processing. Recognizer 101 may train the recognition model using correct answer data.

The recognition model may be a mathematical model called a neural network. Specifically, a recognition model corresponding to an object detection method such as Single Shot multibox Detector (SSD), Faster Region-based Convolutional Neural Network (Faster-RCNN), or You Only Look Once (YOLO) may be used.

Recognizer 101 outputs the plurality of recognition result candidates in the sensing data and the likelihood of each of the plurality of recognition result candidates, to selector 103. That is, recognizer 101 outputs information indicating the plurality of recognition result candidates in the sensing data and the likelihood of each of the plurality of recognition result candidates, to selector 103. Recognizer 101 need not necessarily obtain the final recognition result indicating the recognition result candidate whose likelihood is greater than or equal to the threshold, and output the final recognition result.

Designator 102 is an information processor that obtains an indication designating a part to be analyzed in the sensing data. For example, in the case where the sensing data is an image, designator 102 obtains an indication designating a part included in the image as a part to be analyzed.

Designator 102 may include an input interface or a communication interface for obtaining an indication. The input interface is, for example, a touch panel, a keyboard, a mouse, or a microphone. The communication interface is, for example, a communication terminal or an antenna for obtaining an indication via a communication network.

Selector 103 is an information processor that selects at least one recognition result candidate from the plurality of recognition result candidates in the sensing data.

Specifically, recognizer 101 obtains the plurality of recognition result candidates in the sensing data and the likelihood of each of the plurality of recognition result candidates by inputting the sensing data to the recognition model, as described above. Selector 103 obtains the plurality of recognition result candidates in the sensing data and the likelihood of each of the plurality of recognition result candidates from recognizer 101.

Selector 103 then selects at least one recognition result candidate from the plurality of recognition result candidates, based on the relationship between each of the plurality of recognition result candidates and the designated part and the likelihood of each of the plurality of recognition result candidates. Selector 103 outputs the selected at least one recognition result candidate. That is, selector 103 outputs information indicating the selected at least one recognition result candidate.

As an example, the relationship between each of the plurality of recognition result candidates and the designated part may be whether the recognition result candidate overlaps with the designated part, or the degree of the overlap. Specifically, the at least one recognition result candidate selected by selector 103 may be at least one recognition result candidate that overlaps with the designated part among the plurality of recognition result candidates, or a recognition result candidate having a high degree of overlap with the designated part among the plurality of recognition result candidates.

As another example, the relationship between each of the plurality of recognition result candidates and the designated part may be the Euclidean distance between the recognition result candidate and the designated part. Specifically, the at least one recognition result candidate selected by selector 103 may be at least one recognition result candidate within a range of a predetermined Euclidean distance from the designated part among the plurality of recognition result candidates.

The at least one recognition result candidate selected by selector 103 may be at least one recognition result candidate whose likelihood is higher than a threshold among the plurality of recognition result candidates. That is, selector 103 may select at least one recognition result candidate whose likelihood is higher than the threshold and that overlaps with the designated part or has a high degree of overlap with the designated part, from the plurality of recognition result candidates obtained from recognizer 101. The threshold used by selector 103 to select the recognition result candidate may be lower than the threshold used by recognizer 101 to obtain the recognition result.

Selector 103 may lower the threshold until a predetermined number of recognition, result, candidates are selected from the plurality of recognition result candidates, to select at least one recognition result candidate from the plurality of recognition result candidates.

Analyzer 104 is an information processor that performs analysis processing. For example, analyzer 104 performs analysis processing based on the at least one recognition result candidate output from selector 103, and presents a processing result of the analysis processing. Analyzer 104 may include an output interface or a communication interface for presenting a processing result. The output interface is, for example, a touch panel, a display, or a speaker. The communication interface is, for example, a communication terminal or an antenna for presenting a processing result via a communication network.

Specifically, analyzer 104 presents a processing result indicating the degree of contribution of each of a plurality of values included in the sensing data to the likelihood of each of the at least one recognition result candidate output from selector 103. The degree of contribution of each of the plurality of values to the likelihood of the recognition result candidate is also referred to as the "contribution of each of the plurality of values to the likelihood of the recognition result candidate". For example, in the case where the sensing data is an image including a plurality of pixel values, the processing result indicates the contribution of each of the plurality of pixel values to the likelihood of the recognition result candidate.

Analyzer 104 may perform analysis processing using any of a plurality of methods such as PDA, DIME, Grad-CAM, and G Back Prop. Analyzer 104 may thus present a processing result indicating the contribution of each of the plurality of pixel values to the likelihood of the recognition result candidate. Recognizer 101 and analyzer 104 are optional structural elements, and may not be included in information processing system 100. For example, another recognition system may include recognizer 101, and another analysis system may include analyzer 104.

The sensing data to be processed in information processing system 100 may be other than an image. For example, the sensing data is not limited to two-dimensional data such as an image, but may be one-dimensional data such as waveform data obtained by, for example, a microphone or an inertial sensor. The sensing data may be point group data obtained by LiDAR or radar as an example, or three-dimensional data such as moving image data made up of a plurality of images in chronological order. The sensing data may be data of any other number of dimensions.

The number of dimensions of the sensing data to be processed may be changed. For example, in the case where the sensing data is waveform data, waveform data for a predetermined period may be used to use the sensing data as two-dimensional data. In the case where the sensing data is waveform data, the number of dimensions of the sensing data may be changed by converting waveform data into two-dimensional data of time and frequency like a cepstrum.

In the case where the sensing data is point group data made up of points specified by positions in the horizontal direction, the vertical direction, and the depth direction, point group data obtained in the horizontal direction and the vertical direction (i.e. two-dimensional data) at a specific position in the depth direction may be used. In this case, sensing data in a plane at the specific position in the depth direction may be used.

For example, in speech recognition, the sensing data may be a speech signal representing waveform data of speech. In speech recognition, the element to be recognized may be a word, a sentence, an utterance section, or the like. In three-dimensional object, detection, the sensing data may be point group data that is three-dimensional data. In three-dimensional object detection, the element to be recognized, i.e. the element to be detected, may be a three-dimensional object.

Designator 102 obtains the indication designating the part to be analyzed in the sensing data in any of the foregoing numbers of dimensions. Subsequently, when selector 103 selects at least one recognition result candidate, the relationship between each of the plurality of recognition result candidates and the designated part is used. Here, the overlap rate between the region designated as the part to be analyzed and the recognition result candidate may be used. Alternatively, the Euclidean distance between the coordinates (or coordinate, hereafter the same) designated as the part, to be analyzed and the recognition result candidate may be used.

For example, the condition for selection may be that the overlap rate between the region designated as the part to be analyzed and the recognition result candidate is greater than or equal to a predetermined overlap rate. The condition for selection may be that the Euclidean distance between the coordinates designated as the part to be analyzed and the recognition result candidate is less than or equal to a predetermined Euclidean distance.

The condition for selection in selector 103 may be that the likelihood of the recognition result candidate is higher than the threshold, as mentioned earlier.

Alternatively, selector 103 may select at least one recognition result candidate whose likelihood is relatively high among one or more recognition result candidates that are extracted from the plurality of recognition result candidates output from recognizer 101 based on the relationship between each of the plurality of recognition result candidates and the designated part. For example, selector 103 may select a recognition result candidate having the highest likelihood of the one or more recognition result candidates, or select a predetermined number of recognition result candidates in descending order of likelihood.

Figure 8:
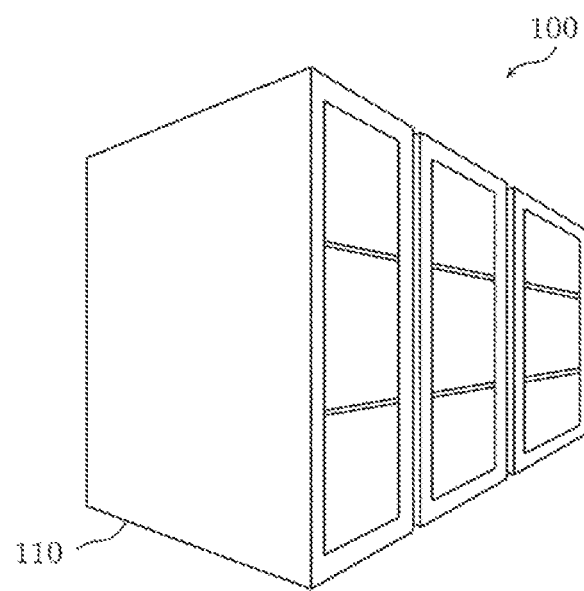
FIG. 8 is an image diagram illustrating negative contribution to the identification result in the reference example.

FIG. 8 is an image diagram illustrating a mode of information processing system 100 illustrated in FIG. 7. For example, information processing system 100 includes computer 110 corresponding to the plurality of structural elements included in information processing system 100 illustrated in FIG. 7. Computer 110 may function as the plurality of structural elements included in information processing system 100 illustrated in FIG. 7. Computer 110 may include a plurality of devices that are dispersedly arranged.

Computer 110 may function only as designator 102 and selector 103, among recognizer 101, designator 102, selector 103, and analyzer 104 illustrated in FIG. 7. One or more devices other than computer 110 may function as recognizer 101 and analyzer 104.

Figure 9:
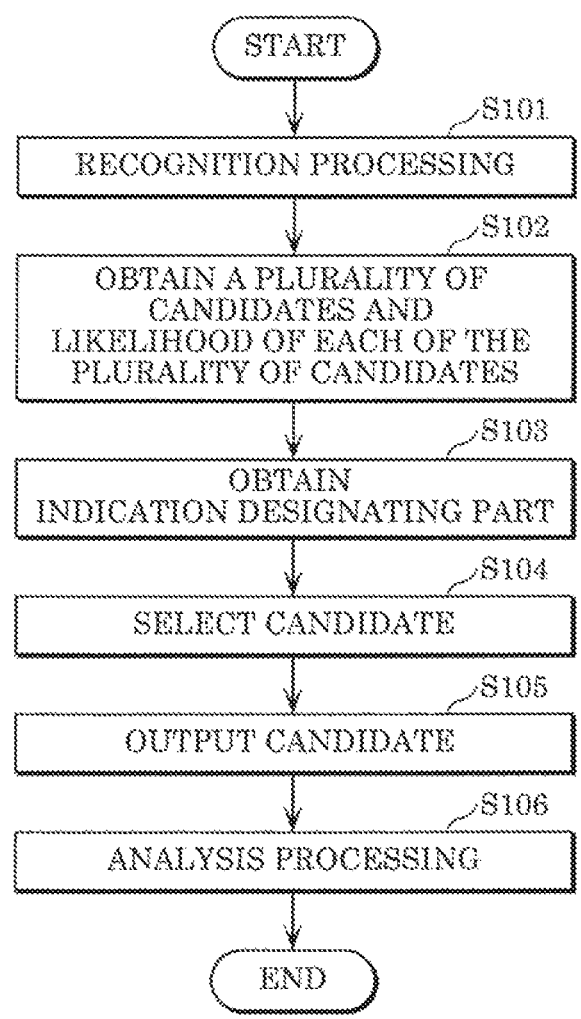
FIG. 9 is a flowchart illustrating a process of the information processing system in the embodiment.

FIG. 9 is a flowchart illustrating a process of information processing system 100 illustrated in FIG. 7. First, recognizer 101 performs recognition processing on sensing data (S101). Specifically, recognizer 101 obtains a plurality of recognition result candidates and the likelihood of each of the plurality of recognition result candidates, by inputting the sensing data to the recognition model. Recognizer 101 outputs the plurality of recognition result candidates and the likelihood of each of the plurality of recognition result candidates.

Selector 103 obtains the plurality of recognition result candidates and the likelihood of each of the plurality of recognition result candidates from recognizer 101 (S102). Designator 102 obtains an indication designating a part to be analyzed in the sensing data (S103). Selector 103 obtains the indication designating the part to be analyzed in the sensing data, via designator 102.

Selector 103 then selects at least one recognition result candidate from the plurality of recognition result candidates, based on the relationship between each of the plurality of recognition result candidates and the designated part and the likelihood of each of the plurality of recognition result candidates (S104). Selector 103 outputs the selected at least one recognition result candidate (S105).

Following this, analyzer 104 performs analysis processing based on the at least one recognition result candidate output from selector 103, and presents a processing result of the analysis processing (S106).

As a result of the above described process, even in the case where an effective recognition result is not obtained in recognition processing, information processing system 100 can output a recognition result candidate useful for analysis processing based on the designated part. Thus, information processing system 100 can present an appropriate processing result of analysis processing based on the recognition result candidate. More specific processes will be described below, using examples. Note that the processes described below are merely examples, and the processes performed by information processing system 100 are not limited to such.

Figure 10:
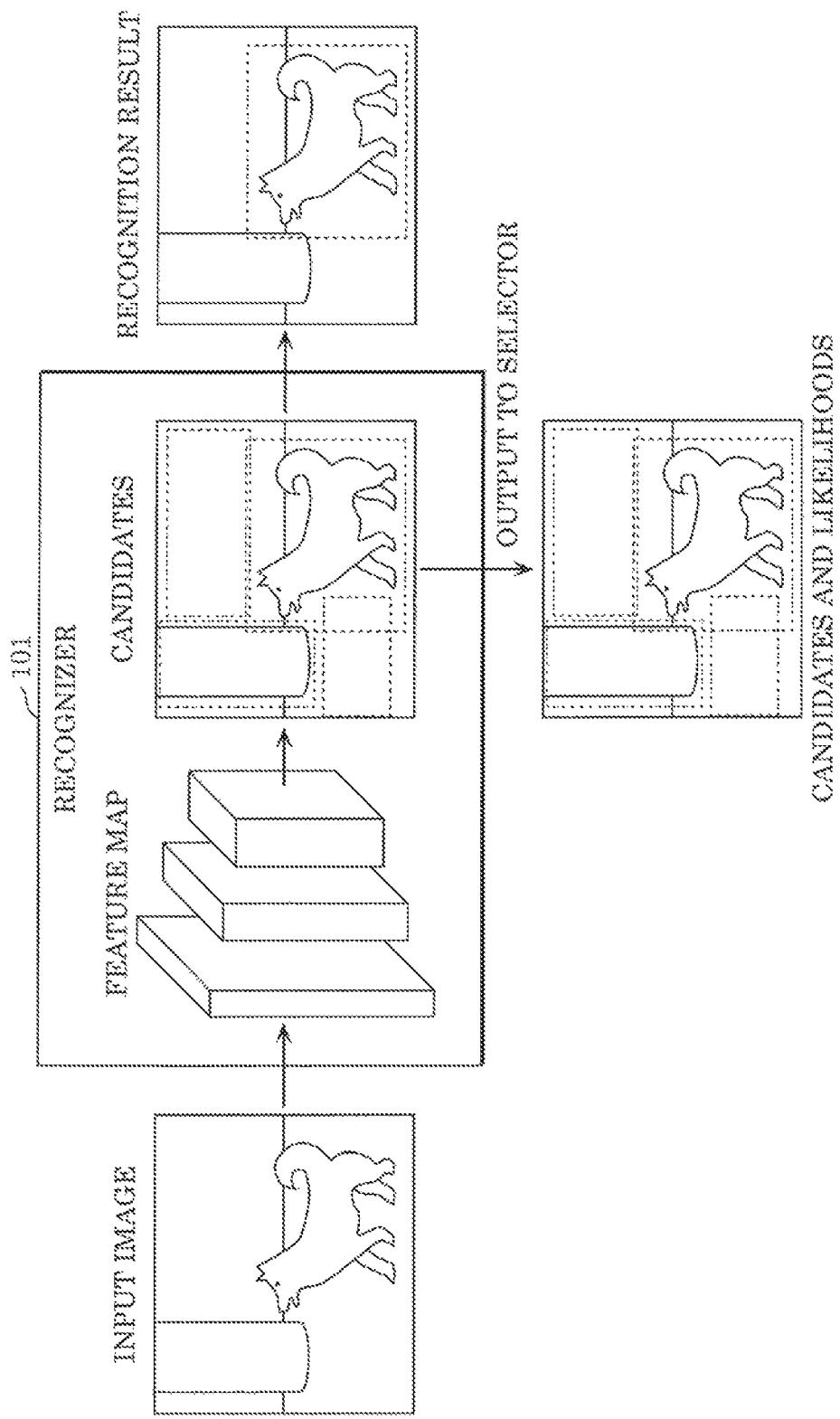
FIG. 10 is a conceptual diagram illustrating a process of a recognizer the embodiment.

FIG. 10 is a conceptual diagram illustrating a process of recognizer 101 illustrated in FIG. 7. Recognizer 101 obtains sensing data, and performs recognition processing on the sensing data. In this example, the sensing data is an image, and the recognition processing is object detection processing on the image. That is, recognizer 101 obtains an input image, and performs object detection processing on the input image.

Specifically, in the object detection processing, recognizer 101 obtains a plurality of recognition result candidates and the likelihood of each of the plurality of recognition result candidates from the input image, using a neural network of a multilayer structure. Each recognition result candidate is a candidate for an object to be recognized in the input image, a candidate for an object, to be detected in the input image.

More specifically, recognizer 101 inputs the input image to an input layer in the neural network of a multilayer structure, and derives a feature map indicating features of the input image in each of a plurality of processing layers in the neural network of a multilayer structure. Recognizer 101 then derives recognition result candidates that match the feature map, and their likelihoods. Thus, recognizer 101 derives a plurality of recognition result candidates and the likelihood of each of the plurality of recognition result candidates from one or more feature maps.

Recognizer 101 outputs the plurality of recognition result candidates and the likelihood of each of the plurality of recognition result candidates, to selector 103.

Recognizer 101 may also determine, based on the likelihood of each of the plurality of recognition result candidates, whether the recognition result candidate is the object to be recognized, i.e. the object to be detected. Recognizer 101 may then output a recognition result indicating, as the object to be recognized, i.e. the object to be detected, the recognition result candidate determined as, the object to be recognized. The determination of whether the recognition result candidate is the object to be recognized and the output of the recognition result may be omitted.

Figure 11:
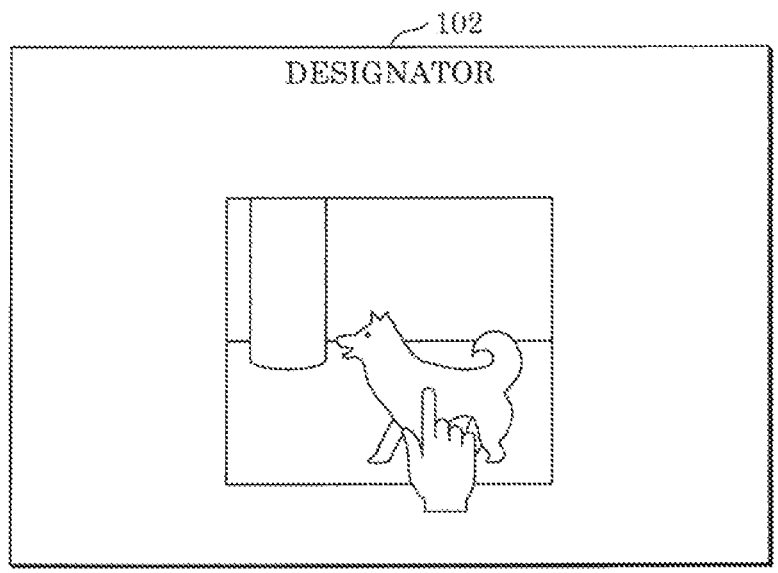
FIG. 11 is a conceptual diagram illustrating a process of a designator in the embodiment.

FIG. 11 is a conceptual diagram illustrating a process of designator 102 illustrated in FIG. 7. Designator 102 obtains an indication designating a part, to be analyzed in the sensing data, in this example, the sensing data is an image, and designator 102 obtains an indication designating a part included in the image as a part to be analyzed. The part to be analyzed may be a point or position to be analyzed, i.e. coordinates to be analyzed. Alternatively, the part to be analyzed may be a region having a width, a size, or the like. In the example in FIG. 11, coordinates are designated as the part to be analyzed.

For example, a user of information processing system 100 designates the part to be analyzed in the sensing data, via the input interface in designator 102. Designator 102 obtains information indicating the designated part, as the indication.

More specifically, designator 102 may include a screen for displaying an image and a mouse for obtaining an input. In this case, designator 102 obtains the image input to recognizer 101, and displays the obtained image on the screen. Designator 102 obtains coordinates clicked with the mouse on the screen on which the image is displayed, as the part to be analyzed, that is, the indication designating the part to be analyzed.

For example, the user can designate the part to be analyzed by clicking, with the mouse, an object displayed on the screen, and designator 102 can obtain the indication designating the part to be analyzed.

A touch panel may be used instead of the combination of the screen and the mouse. Designator 102 may obtain the coordinates touched on the touch panel, as the part: to be analyzed.

Figure 12:
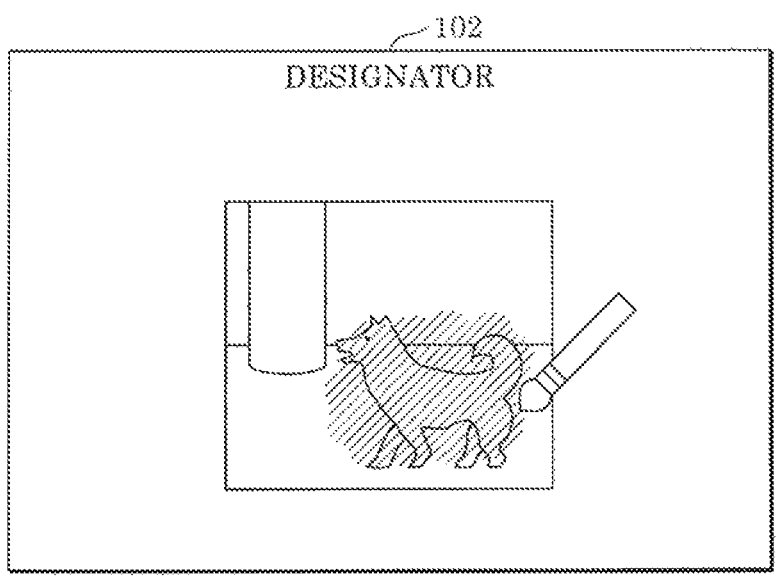
FIG. 12 is a conceptual diagram illustrating another mode of the process of the designator on the embodiment.

FIG. 12 is a conceptual diagram illustrating another mode of the process of designator 102 illustrated in FIG. 7. The part to be analyzed may be designated by an operation of filling in a region corresponding to the part to be analyzed with the mouse. Designator 102 may then obtain the ftlled-in region as the part to be analyzed.

Figure 13:
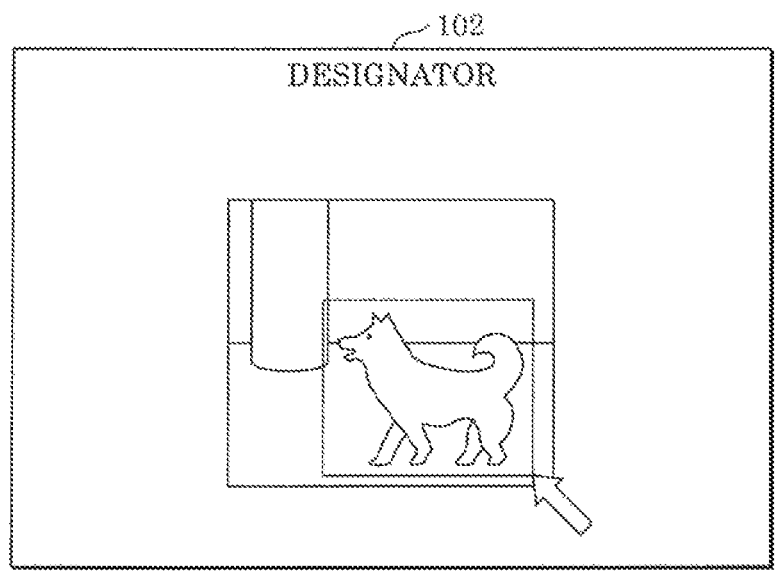
FIG. 13 is a conceptual diagram illustrating yet another mode of the process of the designator in the embodiment.

FIG. 13 is a conceptual diagram illustrating yet another mode of the process of designator 102 illustrated in FIG. 7. The part to be analyzed may be designated by an operation of enclosing a region corresponding to the part, to be analyzed with the mouse. For example, a rectangular frame may be designated by the mouse as the part to be analyzed. Such designation method is also called rectangular selection. The shape is not limited to a rectangle, and the part to be analyzed may be designated in any other polygonal shape or any other shape.

Figure 14:
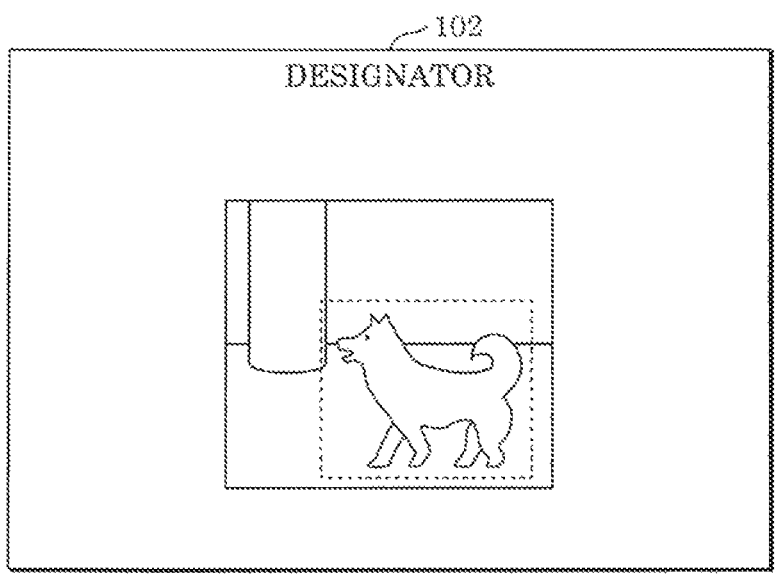
FIG. 14 is a conceptual diagram illustrating yet another mode of the process of the designator in the embodiment.

FIG. 14 is a conceptual diagram illustrating yet another mode of the process of designator 102 illustrated in FIG. 7. Designator 102 may read correct answer data, and obtain, as the part, to be analyzed, a region of an object indicated by the correct, answer data. The correct answer data may be input via a recording medium or the like. The correct answer data may be input to recognizer 101 together with the image. Designator 102 may then obtain the correct answer data from recognizer 101.

As illustrated in FIGS. 11 to 14, there are a plurality of methods of designating a part, to be analyzed. These methods are roughly classified into a method of designating coordinates to be analyzed (FIG. 11) and a method of designating a region to be analyzed (FIGS. 12 to 14). One of the plurality of methods may be used, or two or more of the plurality of methods may be used. The coordinates designated in the indication designating the coordinates to be analyzed as the part to be analyzed are also simply referred to as "designated coordinates". The region designated in the indication designating the region to be analyzed as the part to be analyzed is also simply referred to as "designated region". The part designated in the indication designating the part to be analyzed is also simply referred to as "designated part". Designator 102 outputs the indication designating the coordinates or region to be analyzed as the part to be analyzed, to selector 103.

Figure 15:
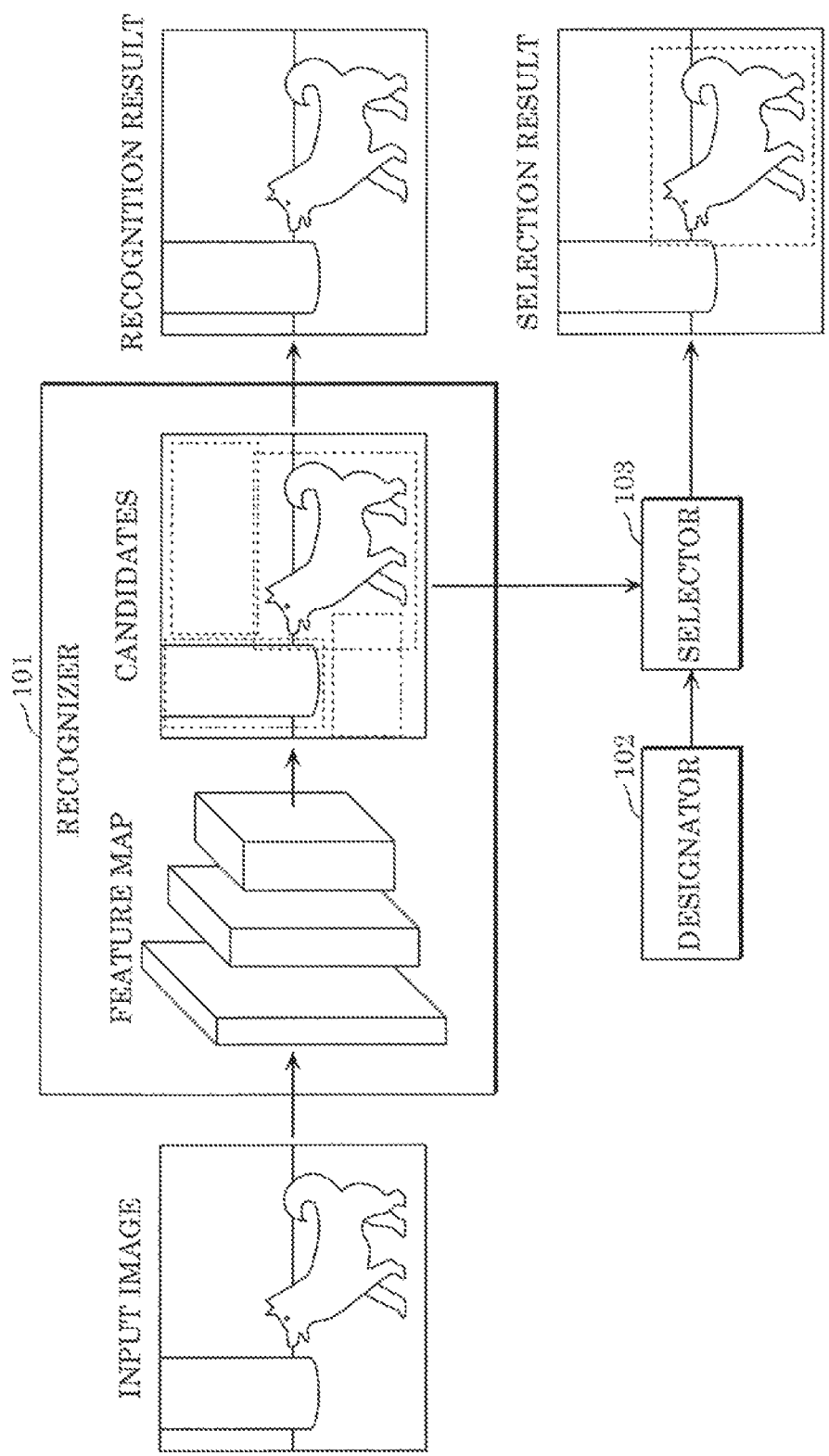
FIG. 15 is a conceptual diagram illustrating a process of a selector in the embodiment.

FIG. 15 is a conceptual diagram illustrating a process of selector 103 illustrated in FIG. 7. Selector 103 selects at least. One recognition result candidate from the plurality of recognition result candidates in the tensing data. Selector 103 obtains the plurality of recognition result candidates in the sensing data and the likelihood of each of the plurality of recognition result candidates, from recognizer 101. Selector 103 also obtains the indication designating the part to be analyzed, from designator 102.

Selector 103 selects at least one recognition result candidate from the plurality of recognition result candidates based on the likelihood of each of the plurality of recognition result candidates and the designated part, and outputs the selected at least one recognition result candidate. For example, selector 103 selects a recognition result candidate that corresponds to the designated part and has a high likelihood, from the plurality of recognition result candidates. Selector 108 may select a plurality of recognition result candidates. Specifically, selector 103 may select three recognition result candidates in descending order of likelihood.

For example, even in the case where an object is not detected in detection processing performed by recognizer 101, selector 103 selects and outputs at least one recognition result candidate corresponding to the designated part, i.e. at least one detection result candidate corresponding to the designated part.

Figure 16:
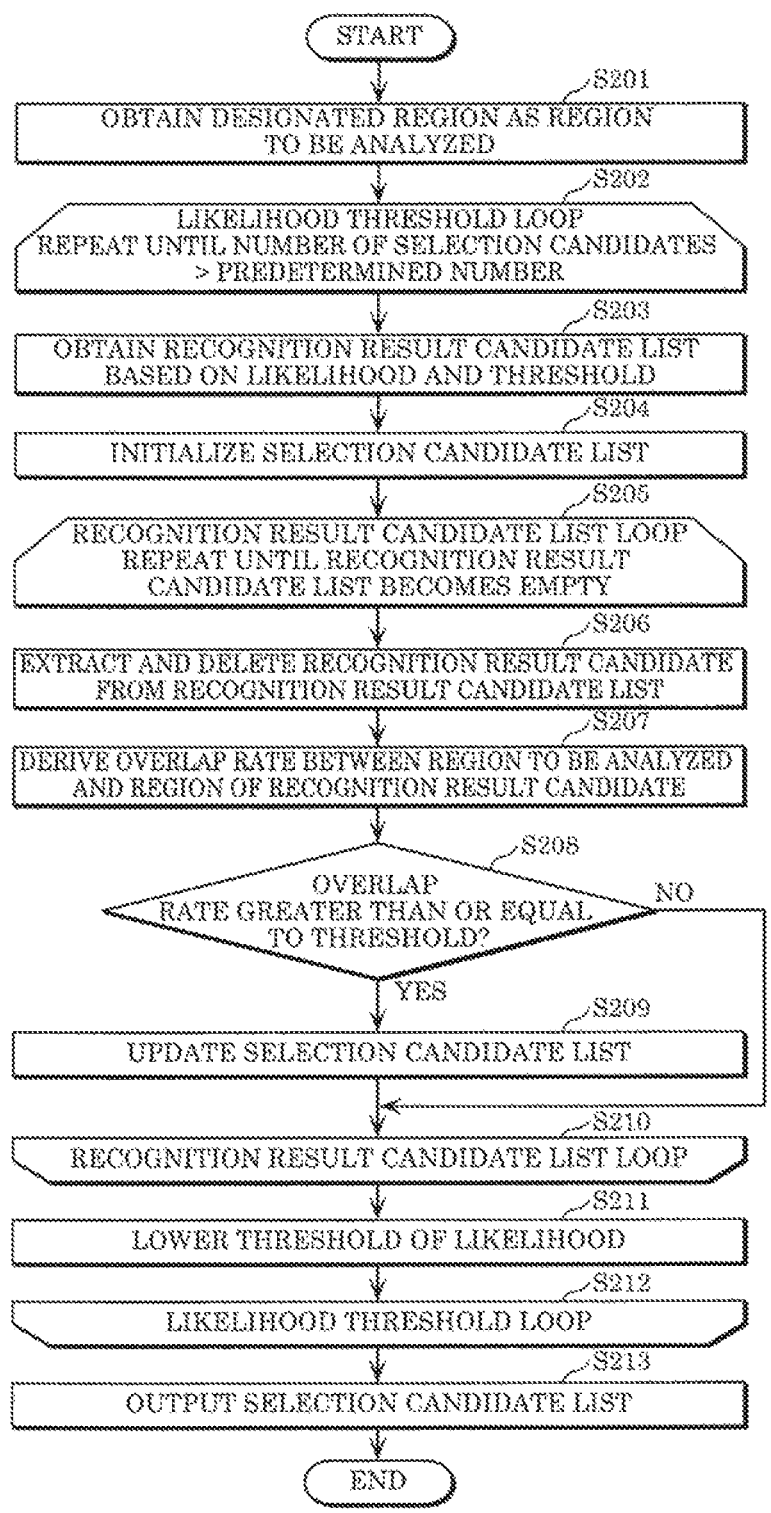
FIG. 16 is a flowchart illustrating a process of the selector in the embodiment.

FIG. 16 is a flowchart illustrating the process of selector 103 illustrated in FIG. 15. This example corresponds to the process in the case where a region to be analyzed is desigimted as a part to be analyzed.

First, selector 103 obtains an indication, designating a region to be analyzed from designator 102, thus obtaining the designated region as the region to be analyzed (S201). Selector 103 then repeatedly performs a likelihood threshold loop until the number of selection candidates exceeds a predetermined number (S202 to S212).

In the likelihood threshold loop, selector 103 obtains a recognition result candidate list made up of recognition result candidates each having a likelihood higher than the threshold, based on the likelihood of each of the plurality of recognition result candidates and the threshold (S205). Selector 103 may obtain the recpnition result candidate list from recognizer 101 based on the likelihood and the threshold, in the likelihood threshold loop. Alternatively, selector 103 may obtain the plurality of recognition result candidates and the likelihood of each of the plurality of recognition result candidates from recognizer 101 before the likelihood threshold loop, and obtain the recognition result candidate list from the obtained plurality of recognition result candidates, etc. in the likelihood threshold loop.

Selector 103 then initializes a selection candidate list (S204). For example, there is a possibility that a recognition result candidate has been added to the selection candidate list in the likelihood threshold loop. Selector 103 deletes such a recognition result candidate added to the selection candidate list, from the selection candidate list. Selector 103 then repeatedly performs a recognition result candidate list loop (S205 to S210) until the recognition result candidate list becomes empty.

In the recognition result candidate list loop, selector 103 extracts one recognition result candidate from the recognition result candidate list, and deletes the extracted recognition result candidate from the recognition result candidate list (S206). Selector 103 then derives the overlap rate between the region to be analyzed and the region of the extracted recognition result candidate (S207). For example, the overlap rate corresponds to the proportion in which the region of the extracted recognition result candidate is included in the region to be analyzed, IoU (Intersection over Union) may be used as the overlap rate.

Selecter 103 determines whether the overlap rate is greater than or equal to a threshold (S208). In the ease where the overlap rate is greater than or equal to the threshold (S208: Yes), selector 103 updates the selection candidate list (S209). In detail, selector 103 adds the extracted recognition result candidate to the selection candidate list. In the case where the overlap rate is less than the threshold (S208: No), selector 103 does not update the selection candidate list. In detail, selector 103 does not add the extracted recognition result candidate to the selection candidate list.

Selector 103 repeatedly performs the recognition result candidate list loop (S205 to S210) until the recognition result candidate list becomes empty. After this, selector 103 lowers the threshold of the likelihood (S211). Selector 103 then repeatedly performs the likelihood threshold loop until the number of selection candidates exceeds the predetermined number (S202 to S212). The number of selection candidates corresponds to the number of recognition result candidates the selection candidate list. That is, selector 103 selects a recognition result candidate while lowering the threshold, until the number of recognition result candidates selected exceeds the predetermined number.

Once the number of selection candidates exceeds the predetermined number, selector 103 outputs the selection candidate list (S213).

By the above-described process, selector 103 can select at least one recognition result candidate from the plurality of recognition result candidates based on the likelihood of each of the plurality of recognition result candidates and the designated part, and output the selected at least one recognition result candidate.

Figure 17:
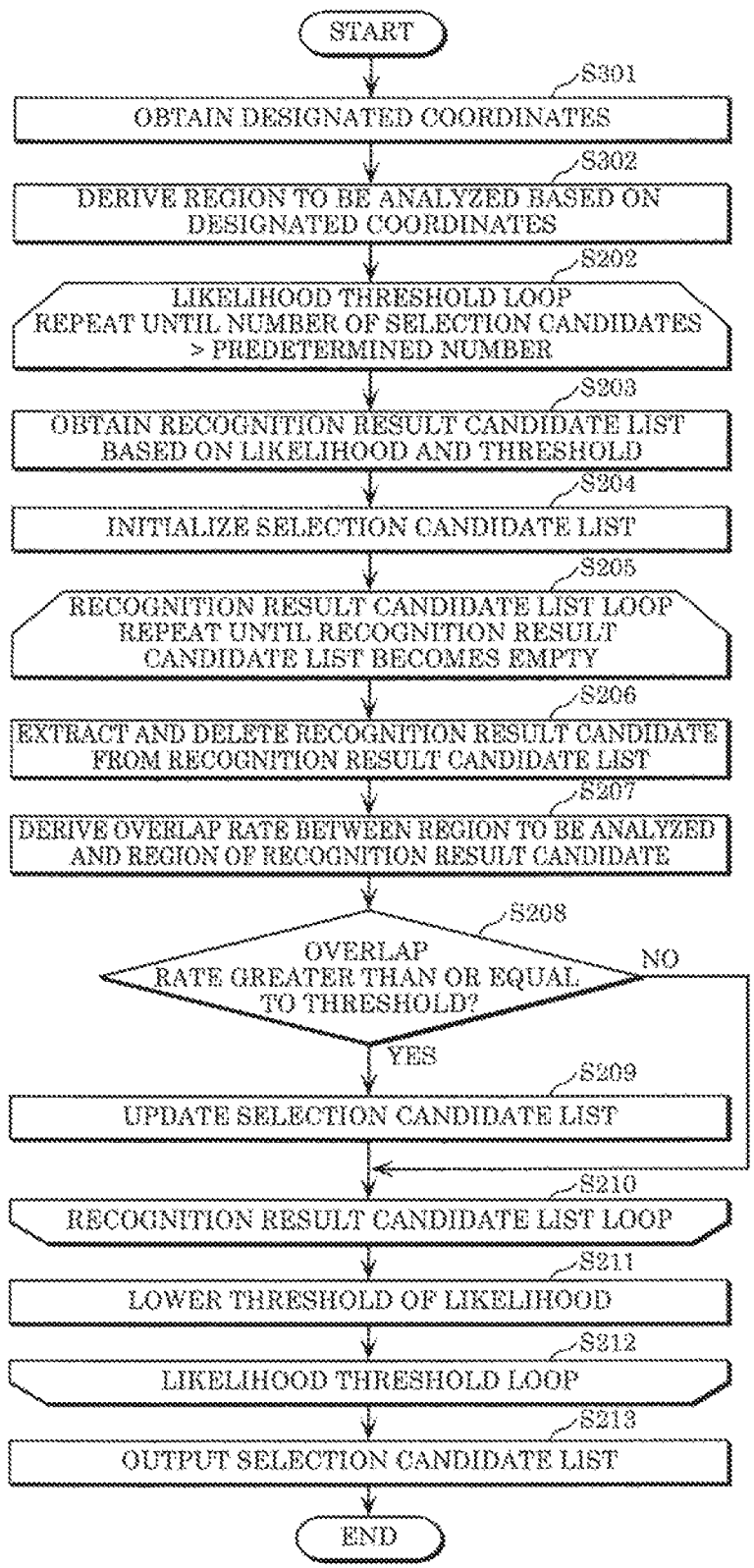
FIG. 17 is a flowchart illustrating another mode of the process of the selector in the embodiment.

FIG. 17 is a flowchart illustrating another mode of the process of selector 103 illustrated in FIG. 15. This example corresponds to the process in the case where coordinates to be analyzed are designated as a part to be analyzed.

First, selector 103 obtains an indication designating coordinates to be analyzed from designator 102, thus obtaining the designated coordinates (S301). Selector 103 derives a region to be analyzed based on the designated coordinates, thus obtaining the region to be analyzed (S302). The subsequent process is the same as the process after the region to be analyzed is obtained in FIG. 16 (S202 to S213).

Figure 18:
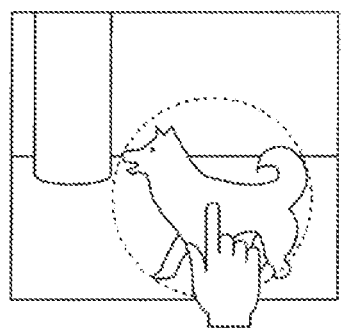
FIG. 18 is a conceptual diagram illustrating a process of deriving a region to be analyzed from designated coordinates in the embodiment.

FIG. 18 is a conceptual diagram illustrating a process of deriving a region to be analyzed from designated coordinates in selector 103 illustrated in FIG. 15. Selector 103 may derive a region of a range relatively defined from the designated coordinates, as the region to be analyzed. In the example in FIG. 18, the region to be analyzed is a region that has the designated coordinates at the center and is defined by a circle having a predetermined radius. The region to be analyzed is not limited to such, and may be a rectangular region that has the designated coordinates at the barycenter, or any other polygonal region that has the designated coordinates at the barycenter.

Designator 102 may obtain an indication designating at least one of the shape and the size of the region to be analyzed, and output the indication to selector 103. Selector 103 may derive the region to be analyzed, based on the designated coordinates and the designated shape or size.

Figure 19:
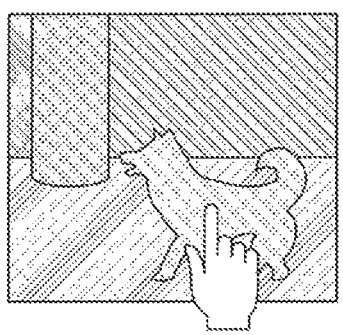
FIG. 19 is a conceptual diagram illustrating another mode of the process of deriving a region to be analyzed from designated coordinates in the embodiment.

FIG. 19 is a conceptual diagram illustrating another mode of the process of deriving a region to be analyzed from designated coordinates in selector 103 illustrated in FIG. 15. Selector 103 may derive the region to be analyzed, based on a segmentation result of the image input to recognizer 101 and the designated coordinates in detail, selector 103 may derive a region of a segment including the designated coordinates among a plurality of segments indicated by the segmentation result of the image, as the region to be analyzed.

The image may be segmented by a neural network, by edge detection of the image, or the like. The image may be segmented by recognizer 101, by designator 102, by selector 103, or by any other structural element. Selector 103 may obtain the segmentation result of the image from outside of information processing system 100.

The processes illustrated in FIGS. 18 and 19 are examples, and other processes that produce the same result may be used.

The above describes an example in which, in the case where designator 102 obtains an indication designating coordinates, selector 103 derives a region to be analyzed from the designated coordinates. Alternatively, designator 102 may derive the region to be analyzed from the designated coordinates. Designator 102 may obtain an indication designating coordinates in the sensing data, as an indication designating a region to be analyzed. In this case, a region is used as a part to be analyzed, instead of coordinates.

FIG. 20 is a conceptual diagram illustrating a process of analyzer 104 illustrated in FIG. 7. Analyzer 104 performs analysis processing based on at least one recognition result candidate output from selector 103, and presents a processing result of the analysis processing. Specifically, analyzer 104 presents a processing result indicating the degree of contribution of each of a plurality of values included in the sensing data to the likelihood of each of the at least one recognition result candidate output from selector 103. Here, the sensing data is an image, and the processing result indicates the contribution of each of a plurality of pixel values to the likelihood of the recognition result candidate.

Specifically, analyzer 104 derives the contribution to the likelihood of the recognition result candidate using any of a plurality of methods such as PDA, LIME, Grad-CAM, and G Back Prop, as in the derivation of the contribution to the identification result. Analyzer 104 then presents a processing result indicating the contribution, for example on a screen of analyzer 104.

In this example, the degree of positive contribution to the likelihood of the recognition result candidate is expressed by point density, as positive contribution. The degree of positive contribution to the likelihood of the recognition result candidate may be expressed by color density or the like, for each pixel. Specifically, a part showing the head of a dog and a part showing the tail of a dog in the input image positively contribute to the likelihood of the recognition result, candidate. That is, the part showing the head of a dog and the part Showing the tail of a dog contribute to higher likelihood of the recognition result candidate.

The degree of negative contribution to the likelihood of the recognition result candidate is expressed by point density, as negative contribution. The degree of negative contribution to the likelihood of the recognition result candidate may be expressed by color density or the like, for each pixel. Specifically, a part showing the front legs of a dog negatively contributes to the likelihood of the recognition result candidate. That is, the part showing the front legs of a dog contributes to lower likelihood of the recognition result candidate.

Although positive contribution and negative contribution are separately expressed in this example, positive contribution and negative contribution may be expressed in combination. For example, the degree of positive contribution to the likelihood of the recognition result candidate and the degree of negative contribution to the likelihood of the recognition result candidate may be expressed respectively by red color density and blue color density.

Analyzer 104 play perform analysis processing on each of a plurality of recognition result candidates and present a processing result, thus presenting the plurality of processing results for the plurality of recognition result candidates. Alternatively, analyzer 104 may present one processing result by integrating the plurality of processing results obtained for the plurality of recognition result candidates.

Information processing system 100 described above can be used in detection processing of a plurality of types of objects in images. Although object detection processing is used as recognition processing in FIGS. 10 to 20, other recognition processing such as segmentation processing may be used.

While an aspect of information processing system 100 has been described by way of embodimets, etc., an aspect of information processing system 100 is not limited to such embodiments, etc. Modifications conceivable by a person skilled in the art may be made to the embodiments, etc., and a plurality of structural elements in the embodiments, etc. may be freely combined. For example, in the embodiments, etc., processes performed by specific structural elements may be performed by other structural elements instead of the specific structural elements. Moreover, a plurality of processes may be changed in order, and a plurality of processes may be performed in parallel.

An information processing method including steps performed by the structural elements in information processing system 100 may be performed by any device or system. For example, the information processing method may be performed by a computer (computer 110 or another computer) including a processor, a memory, and an input/output circuit. The computer may execute a program for performing the information processing method, thus performing the information processing method.

The program may be recorded in a non-transitory computer-readable recording medium.

For example, the program causes the computer to perform an information processing method including: obtaining a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing; obtaining an indication designating a part to be analyzed in the sensing data; selecting at least one recognition result candidate from the plurality of recognition result candidates, based on (i) a relationship between each of the plurality of recognition result candidates and the part and (ii) the likelihood of each of the plurality of recognition result candidates; and outputting the at least one recognition result candidate that is selected.

The plurality of structural elements in information processing system 100 may be implemented by special-purpose hardware, by general-purpose hardware for executing the foregoing program and the like, or by a combination thereof. The general-purpose hardware may include a memory storing the program, and a general-purpose processor for reading the program from the memory and executing the program. The memory may be a semiconductor memory, a hard disk, or the like. The general-purpose processor may be a CPU or the like.

The special-purpose hardware may include a memory and a special-purpose processor. For example, the special-purpose processor may perform the foregoing information processing method with reference to the memory storing information of the recognition model.

Each structural element in information processing system 100 may be an electric circuit. These electric circuits may form one electric circuit as a whole, or may be separate electric circuits. These electric circuits may correspond to special-purpose hardware, or correspond to general-purpose hardware for executing the foregoing program and the like.

A basic structure and typical modifications of information processing system 100 according to an aspect of the present, disclosure will be described below. These may be combined with each other, or combined with part of the foregoing embodiments, etc.

(1) In an information processing method according to an aspect of the present disclosure, computer 110 obtains a plurality of recognition result candidates in sensing data and a likelihood of each of the plurality of recognition result candidates, the plurality of recognition result candidates and the likelihood being obtained by inputting the sensing data to a model (S102). The model is trained by machine learning and performs recognition processing.

Computer 110 obtains an indication designating a part to be analyzed in the sensing data (S103). Computer 110 selects at least one recognition result candidate from the plurality of recognition result candidates, based on a relationship between each of the plurality of recognition result candidates and the part to be analyzed and the likelihood of each of the plurality of recognition result candidates (S104). Computer 110 outputs the at least one recognition result candidate that is selected (S105).

Thus, even in the case where an effective recognition result is not obtained in recognition processing, a recognition result candidate useful for analysis processing or the like can be output based on the designated part. That is, even in the case where an object is not detected in recognition processing, information for analysis of output of recognition processing can be output.

(2) For example, computer 110 presents a processing result based on the at least one recognition result candidate that is output. Thus, the processing result of analysis processing or the like based on the selected recognition result candidate can be presented.

(3) For example, the processing result indicates a degree of contribution of each of a plurality of values included in the sensing data to a likelihood of each of the at least, one recognition result candidate that is output. Thus, the contribution of each of the plurality of values in the sensing data to the selected recognition result candidate can be presented.

(4) For example, the relationship between each of the plurality of recognition result candidates and the part to be analyzed is at least one of: whether the recognition result candidate overlaps with the part to be analyzed; and a degree of overlap of the recognition result candidate with the part to be analyzed. Thus, the recognition result candidate selected based on whether it overlaps with the designated part or the degree of the overlap can be output.

(5) For example, each of the at least, one recognition result candidate selected from the plurality of recognition result candidates is a recognition result candidate whose likelihood is higher than a threshold among the plurality of recognition result candidates. Thus, a recognition result candidate with a high likelihood can be selected, so that a more useful recognition result candidate can be output.

(6) For example, computer 110 lowers the threshold, in a case where a total number of recognition result candidates selected from the plurality of recognition result candidates based on the relationship, the likelihood, and the threshold is less than or equal to a predetermined number. Computer 110 selects the at least one recognition result candidate, based on the relationship, the likelihood, and the threshold lowered.

Here, the relationship is the relationship between each of the plurality of recognition result candidates and the part to be analyzed, the likelihood is the likelihood of each of the plurality of recognition result candidates, and the threshold is a threshold for selecting the at least one recognition result candidate.

Thus, for example in the case where there is no recognition result candidate whose likelihood is higher than the threshold, the threshold can be lowered, and a recognition result candidate whose likelihood is higher than the lowered threshold can be selected. The predetermined number may be 0, 1, or 2 or more.

(7) For example, computer 110 outputs a likelihood of each of the at least one recognition result candidate that is selected. Thus, the likelihood of the selected recognition result candidate can be output as information useful for analysis processing or the like.

(8) For example, the sensing data is an image, the recognition processing is object recognition processing on the image, and each of the plurality of recognition result candidates is a candidate for an object shown in the image. Thus, in object recognition processing performed on an image, a candidate for an object shown in the image can be output.

(9) Information processing system 100 according to an aspect of the present disclosure includes computer 110. Computer 110 obtains a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing (S102).

Computer 110 obtains an indication designating a part to be analyzed in the sensing data (S103). Computer 110 selects at least one recognition result candidate from the plurality of recognition result candidates, based on a relationship between each of the plurality of recognition result candidates and the part to be analyzed and the likelihood of each of the plurality of recognition result candidates (Sl04). Computer 110 outputs the at least one recognition result candidate that is selected (S105).

Thus, even in the case where an effective recognition result is not obtained in recognition processing, information processing system 100 can output a recognition result candidate useful for analysis processing or the like based on the designated part. That is, even in the ease where an object is not detected in recognition processing, information processing system 100 can output information for analysis of output of recognition processing.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The presently disclosed techniques are usable for output of information for analyzing recognition processing, and can be used, for example, in an information processing system for improving a recognition system or an analysis system.

What is claimed is:

1. An information processing method performed by a computer and comprising:
    obtaining a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing;
    obtaining, from a user, an indication designating a part to be analyzed in the sensing data;
    selecting at least one recognition result candidate from the plurality of recognition result candidates, based on (i) a relationship between each of the plurality of recognition result candidates and the part and (ii) the likelihood of each of the plurality of recognition result candidates; and
    outputting the at least one recognition result candidate that is selected,
    wherein each of the at least one recognition result candidate selected from the plurality of recognition result candidates is a recognition result candidate whose likelihood is higher than a threshold among the plurality of recognition result candidates, and
    the information processing method performed by the computer further comprises:
    lowering the threshold, in a case where a total number of recognition result candidates selected from the plurality of recognition result candidates based on the relationship, the likelihood, and the threshold is less than or equal to a predetermined number; and
    selecting the at least one recognition result candidate, based on the relationship, the likelihood, and the threshold lowered.

2. The information processing method according to claim 1, performed by the computer and further comprising:
    presenting a processing result based on the at least one recognition result candidate that is output.

3. The information processing method according to claim 2,
    wherein the processing result indicates a degree of contribution of each of a plurality of values included in the sensing data to a likelihood of each of the at least one recognition result candidate that is output.

4. The information processing method according to claim 1,
wherein the relationship is at least one of: whether the recognition result candidate overlaps with the part; and a degree of overlap of the recognition result candidate with the part.

5. The information processing method according to claim 1, performed by the computer and further comprising:
outputting a likelihood of each of the at least one recognition result candidate that is selected.

6. The information processing method according to claim 1,
wherein the sensing data is an image,
the recognition processing is object recognition processing on the image, and
each of the plurality of recognition result candidates is a candidate for an object shown in the image.

7. An information processing system, comprising:
a computer that:
obtains a plurality of recognition result candidates in sensing data and a likelihood of each of the plurality of recognition result candidates, the plurality of recognition result candidates and the likelihood being obtained by inputting the sensing data to a model that is trained by machine learning and performs recognition processing;

obtains, from a user, an indication designating a part to be analyzed in the sensing data;

selects at least one recognition result candidate from the plurality of recognition result candidates, based on (i) a relationship between each of the plurality of recognition result candidates and the part and (ii) the likelihood of each of the plurality of recognition result candidates; and outputs the at least one recognition result candidate that is selected, wherein each of the at least one recognition result candidate selected from the plurality of recognition result candidates is a recognition result candidate whose likelihood is higher than a threshold among the plurality of recognition result candidates, and the computer further:
lowers the threshold, in a case where a total number of recognition result candidates selected from the plurality of recognition result candidates based on the relationship, the likelihood, and the threshold is less than or equal to a predetermined number; and selects the at least one recognition result candidate, based on the relationship, the likelihood, and the threshold lowered.

* * * * *